US008732437B2

(12) United States Patent
Spracklen

(10) Patent No.: US 8,732,437 B2
(45) Date of Patent: May 20, 2014

(54) LOW-OVERHEAD MISALIGNMENT AND REFORMATTING SUPPORT FOR SIMD

(75) Inventor: Lawrence A. Spracklen, Boulder Creek, CA (US)

(73) Assignee: Oracle America, Inc., Redwood City, CA (US)

( * ) Notice: Subject to any disclaimer, the term of this patent is extended or adjusted under 35 U.S.C. 154(b) by 930 days.

(21) Appl. No.: 12/693,634

(22) Filed: Jan. 26, 2010

(65) Prior Publication Data

US 2011/0185150 A1    Jul. 28, 2011

(51) Int. Cl.
G06F 15/00    (2006.01)
G06F 15/76    (2006.01)

(52) U.S. Cl.
USPC .......................................................... 712/22

(58) Field of Classification Search
None
See application file for complete search history.

(56) References Cited

U.S. PATENT DOCUMENTS

| 5,361,370 A | 11/1994 | Sprague et al. |
| 5,655,131 A | 8/1997 | Davies |
| 6,113,650 A * | 9/2000 | Sakai .............................. 717/160 |
| 7,386,706 B2 | 6/2008 | Hansen et al. |
| 7,480,787 B1 | 1/2009 | Caprioli et al. |
| 7,558,939 B2 | 7/2009 | Banerjee et al. |
| 7,921,263 B2 * | 4/2011 | Taunton ......................... 711/154 |
| 2008/0201699 A1 * | 8/2008 | Eichenberger et al. ....... 717/161 |

OTHER PUBLICATIONS

Nuzman et al. (Auto-Vectorization of Interleaved Data for SIMD, Jun. 2006, pp. 132-243).*

* cited by examiner

*Primary Examiner* — Robert Fennema
*Assistant Examiner* — George Giroux
(74) *Attorney, Agent, or Firm* — Marsh Fischmann & Breyfogle LLP; Daniel J. Sherwinter

(57) ABSTRACT

Systems and methods for performing single instruction multiple data (SIMD) operations on a data set. The methods may include examining a structure of the data set to determine what reorganization may be necessary to facilitate SIMD processing. The method may include selecting a stored bit mask corresponding to the organization of the data set and loading the bit mask into an application specific register (ASR). Subsequently, the data may be reorganized inline according to the ASR as the data is loaded into the SIMD functional unit such that the SIMD functional unit may operate on the data set. The results of the SIMD operation may be written to a results register.

19 Claims, 7 Drawing Sheets

LOW-OVERHEAD MISALIGNMENT AND REFORMATTING SUPPORT FOR SIMD

BACKGROUND OF THE INVENTION

The instructions in the instructions sets used with single instruction multiple data (SIMD) architectures operate on a plurality of operands with the same operation. For example, first and second floating point registers are used to store source operands A0 to An, and B0 to Bn, respectively. For a particular function op, each source operand $A\_s$ (where s ranges from 0 to n) in the first register and an identically positioned source operand $B\_s$ in the second register may be operated on by an execution unit of a microprocessor to produce a result $R\_s$. The result $R\_s$ is stored in a corresponding location in a result register.

SIMD instructions have the potential to deliver significant performance improvements in a wide variety of important applications. However, the pair-wise operation (e.g., A0+B0||A1+B1) of these SIMD instructions can make them difficult to use effectively if the data incorrectly organized or misaligned. This tends to be more of a problem when retrofitting SIMD processing to existing applications, where the data organization may have been undertaken without taking its suitability for SIMD in to consideration. However, even in new applications, the requirement to organize and align the data to suit the requirements of the SIMD instructions can be a significant burden for the programmer (and/or compiler), particularly if operations like convoluted cross-product operations are required. Further, autovectorization, the process where the compiler will automatically use SIMD instructions, can be often frustrated by data organization or alignment problems, therefore significantly curtailing the benefits of the SIMD support.

To combat these problems, two approaches have typically been employed. Firstly, an ever more complex set of instructions have been introduced in an effort to allow programmers to more cost effectively reorganize the data before processing. Secondly, new SIMD instructions have been introduced that perform operations in a different order to the standard pair-wise ordering, in an effort to support other commonly occurring data organizations (e.g., an array of structures versus a structure of arrays).

The requirement to use data reorganization (swizzle) instructions will always introduce a performance overhead. While the sophistication of these swizzle instructions has improved over time, they can still cut performance by 50% in many situations. Further, this situation tends to be exacerbated on chip multithreading (CMT) processors, where there tends to be: i) slightly fewer execution resources; and ii) many hardware strands sharing these resources. In this situation, it is often not feasible to "hide" the impact of the swizzle instructions—even if the latency of the operations themselves can be hidden, the requirement to issue these additional instructions will often prevent other, more useful, processing from being undertaken. With respect to adding new forms of SIMD instructions in an attempt to handle different data organizations; it is limiting since only a few additional organizations can be realistically supported, and, in addition, it is very wasteful of opcode resources—an increasingly valuable commodity on RISC processors with 32-bit opcodes. Further, in some situations the formatting or alignment cannot be easily determined statically.

SUMMARY OF THE INVENTION

The embodiments disclosed herein provide methods and systems for low-overhead misalignment and reformatting support for SIMD processing. In this regard, the need for separate data reorganization steps prior to SIMD processing is eliminated. Various features and embodiments of the present invention are described in detail below.

According to a first aspect, a computer implemented method of performing a SIMD operation on a data set is provided. The method includes selecting a stored bit mask for reorganizing the data set to facilitate performance of the SIMD operation on the data set. The method further includes reorganizing, after the selecting step, at least a first portion of the data set as the data set is loaded into a SIMD processing unit. The reorganizing is performed according to an application specific register. Furthermore, the method includes performing the SIMD operation on the data set after the reorganizing step, and writing a result of the SIMD operation to a destination register after the performing step.

According to a second aspect, a computer system for performing a SIMD operation is provided. The computer system includes a processor and a data storage coupled to the processor. The data storage stores instructions that are operative to be executed by the processor to determine a structure of a data set, and select, based on the structure, a stored bit mask for reorganizing the data set to facilitate performance of the SIMD operation on the data set. The instructions are also operative to be executed by the processor to load the stored bit mask into an application specific register, and reorganize at least a first portion of the data set as the data set is loaded into a SIMD processing unit. The reorganizing is performed according to the stored bit mask in the application specific register. In addition, the instructions are also operative to be executed by the processor to perform the SIMD operation on the data set after the reorganizing step, and write a result of the SIMD operation to a destination register after the performing step.

According to a third aspect, a computer readable medium for performing a SIMD operation is provided. The computer readable medium includes instructions, which when processed by a computer, cause the computer to examine a structure of a data set, and select, based on the structure, a bit mask for reorganizing the data set to facilitate performance of the SIMD operation on the data set. When processed by a computer, the instructions further cause the computer to reorganize at least a first portion of the data set as the data set is loaded into a SIMD processing unit. The reorganizing is performed according to an application specific register. When processed by a computer, the instructions further cause the computer to perform the SIMD operation on the data set after the data set is reorganized, and write a result of the SIMD operation to a destination register.

In addition to the exemplary aspects and embodiments described above, further aspects and embodiments will become apparent by reference to the drawings and by study of the following descriptions.

DETAILED DESCRIPTION

Figure 1:
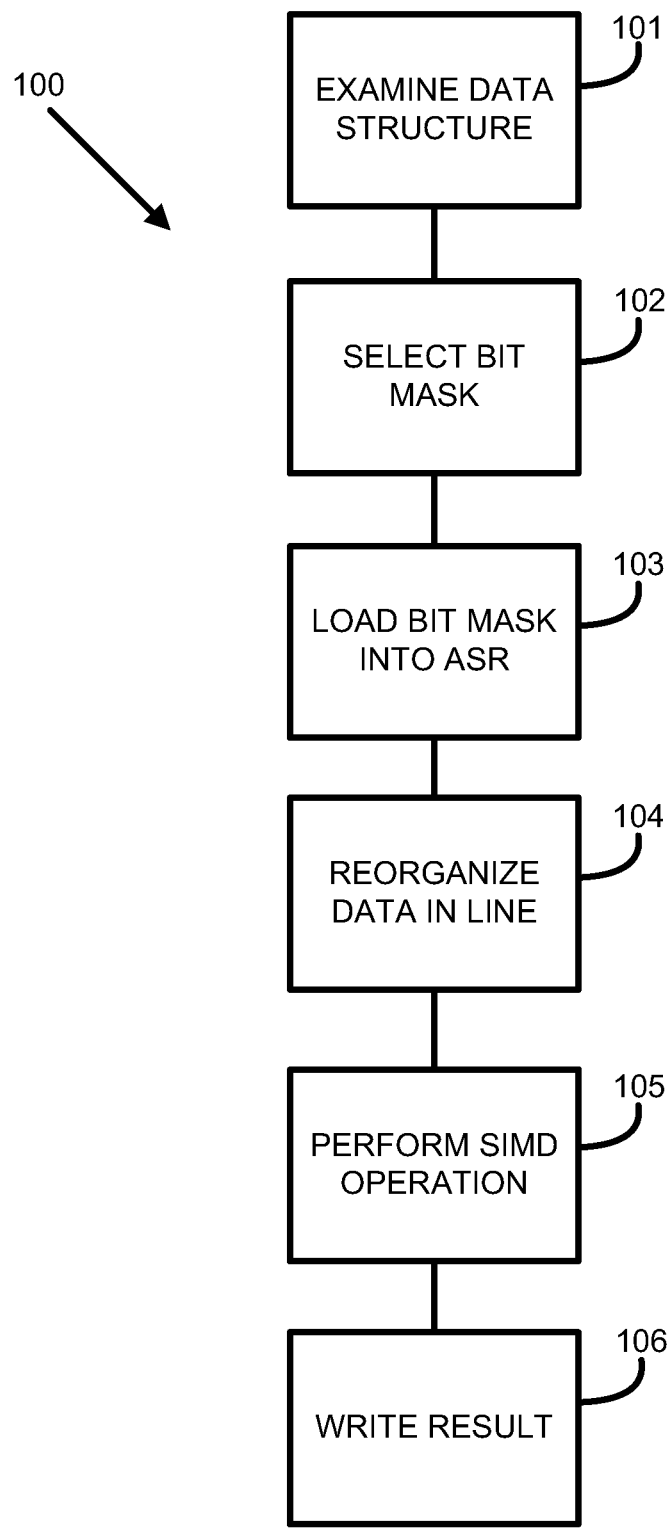
FIG. 1 is a process flow diagram illustrating a method of performing SIMD processing on a data set according to one embodiment.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

SIMD processing efficiency can be increased by augmenting the standard SIMD instructions themselves with data reorganization capabilities. Such augmentation can eliminate the need for separate data reorganization steps to be performed prior to SIMD processing. The augmented SIMD instructions can perform data reorganization inline before the main processing is undertaken. For example, standard SIMD addition operations can automatically perform the data reorganization required for proper operation, without the requirement for additional data reorganization instructions to be used. Such additional inline processing may increase the latency of the SIMD instructions. Such latency may be easier to manage (e.g., by hiding the latency) than the overhead introduced by the requirement for additional separate data reorganization instructions of the prior art.

There are a large number of data configurations that may not be ready for SIMD processing and require some sort of data reorganization prior to SIMD processing. Moreover, the information required to stipulate the necessary data reorganization can be significant, such as for 256-bit SIMD operations on single-precision data types. Accordingly, it may be desirable to not encode this information in the opcode itself. Rather, this information may be obtained from a separate register. Additionally, since there is frequently a requirement for different instructions to simultaneously perform different reordering operations, it is beneficial if multiple registers are supported. The choice of which reordering register is to be utilized can be encoded in the opcode, thus providing significant flexibility. For example, the reordering information may be loaded into one or more application specific registers ("ASRs") using separate instructions. Such loading may typically occur such that the ASRs are set up before entering the loop associated with the compute kernel. A look-up table containing different entries relating to different misalignment possibilities may be utilized to store various bit masks for loading into the ASR. It is noted that since such reorganization is performed once per loop, performance overhead is low, and providing dedicated instructions reduces complexity for compilers.

FIG. 1 is a process flow diagram 100 illustrating one embodiment of a method of performing a SIMD operation on a data set by a computer system. The first step 101 in the method may be to examine the structure of the data set that is to be processed using SIMD processing. The examining step may include testing the data set for proper organization. If the data set is properly organized for SIMD processing, the SIMD processing may proceed normally (e.g., by moving directly to step 105). However, if the testing shows the data elements in the data set are not properly organized for SIMD processing, the testing may determine the type of data organization issue (e.g., interleaved data, misaligned data). Such a testing step may be performed by a compiler.

Once a data organization issue is identified in the examining step 101, the next step 102 may be to select a stored bit mask corresponding to the identified data reorganization issue. The selected stored bit mask will be used to reorganize the data set to facilitate SIMD processing of the data set. The selecting step may include accessing a look-up table. Such a look-up table may include a plurality of stored bit masks corresponding to a plurality of different data set organization issues (e.g., interleaved data, various types of misalignment of the data elements).

The next step 103 may include loading the selected bit mask into the ASR. Instructions for loading the selected bit mask into the ASR may be separate from the SIMD instructions. In a variation, the computer system may include multiple ASRs and in place of loading the stored bit mask, the computer system may indicate which ASR to use for data reorganization. For example, the selecting a bit mask step 102 may be replaced by placing in the SIMD an instruction in buffer indicating which ASR (e.g., ASR0, ASR1 . . . ASRn) to use during SIMD processing or by appending the SIMD instructions with an indication of the ASR to be used.

The next step 104 may be to reorganize at least a first portion of the data set as the data set is loaded into a SIMD processing unit. This reorganizing may be performed according to the designated ASR (e.g., designated by populating the ASR with a selected bit mask or designated by selecting the ASR from the multiple ASRs). Such data reorganization may be performed inline as data is being read into the SIMD functional unit. Accordingly, as data flows from the registers to the SIMD functional unit, it is rearranged by the ASR such that the data appears properly organized to the SIMD functional unit. Such reorganization may be conceptualized as an extension of the SIMD pipeline.

Accordingly, the SIMD functional unit may, in the next step 105, perform a SIMD operation on the data set. In the following step 106, the result of the SIMD processing may be written to a result or destination register.

Figure 3A:
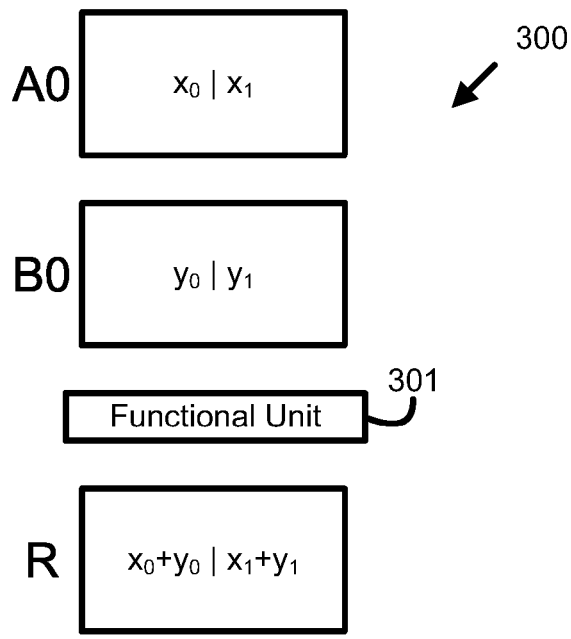
FIG. 3A is a block diagram illustrating a SIMD process flow.

An exemplary implementation will now be described with reference to FIGS. 3A, 3B, and 4. FIG. 3A is a block diagram illustrating a typical SIMD flow 300 for the addition of two arrays x and y, stored in operands A0 and B0, respectively. Arrays x and y contain n elements (elements 0 and 1 are shown in FIG. 3A). Such formatting is compatible with the SIMD pair-wise operation (assuming no alignment problems). Operands A0 and B0 may, for example, each be placed into floating point registers within a processor for SIMD processing. A functional unit 301 (e.g., a floating point functional unit, SIMD processing unit) may perform a single instruction (e.g., addition) on each data element pairing and write the result into a result register R. In the illustrated example, the result of the SIMD processing is the pair wise addition of the data elements, resulting in the desired result of $x_0+y_0\|x_1+y_1$ being placed into the result register R.

Figure 3B:
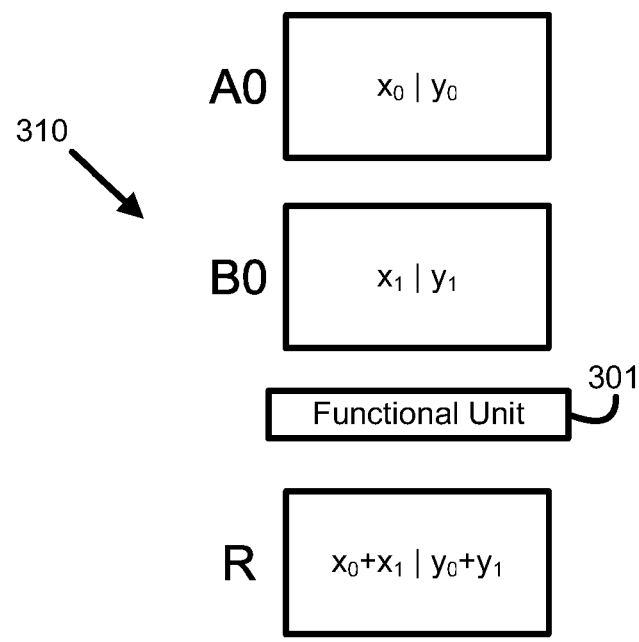
FIG. 3B is a block diagram illustrating a SIMD process flow operating on interleaved data.

FIG. 3B is a block diagram illustrating a typical SIMD flow 310 operating on interleaved data. In this example, the data is interleaved such that data elements from array x and y occupy both operand A0 and operand B0. As such, and as illustrated in FIG. 3B, SIMD processing on such an arrangement produces the undesirable result of $x_0+x_1\|y_0+y_1$ being placed into the results register R. A prior art solution to avoiding such a result was to utilize a reformatting instruction prior to SIMD processing. In this example, one operation would be required to generate the x vector and another operation would be required to generate the y vector such that they may be placed in operands A0 and B0, respectively. Such a solution is resource and time consuming, in part since, for every iteration, there are essentially two formatting operations required.

Figure 4:
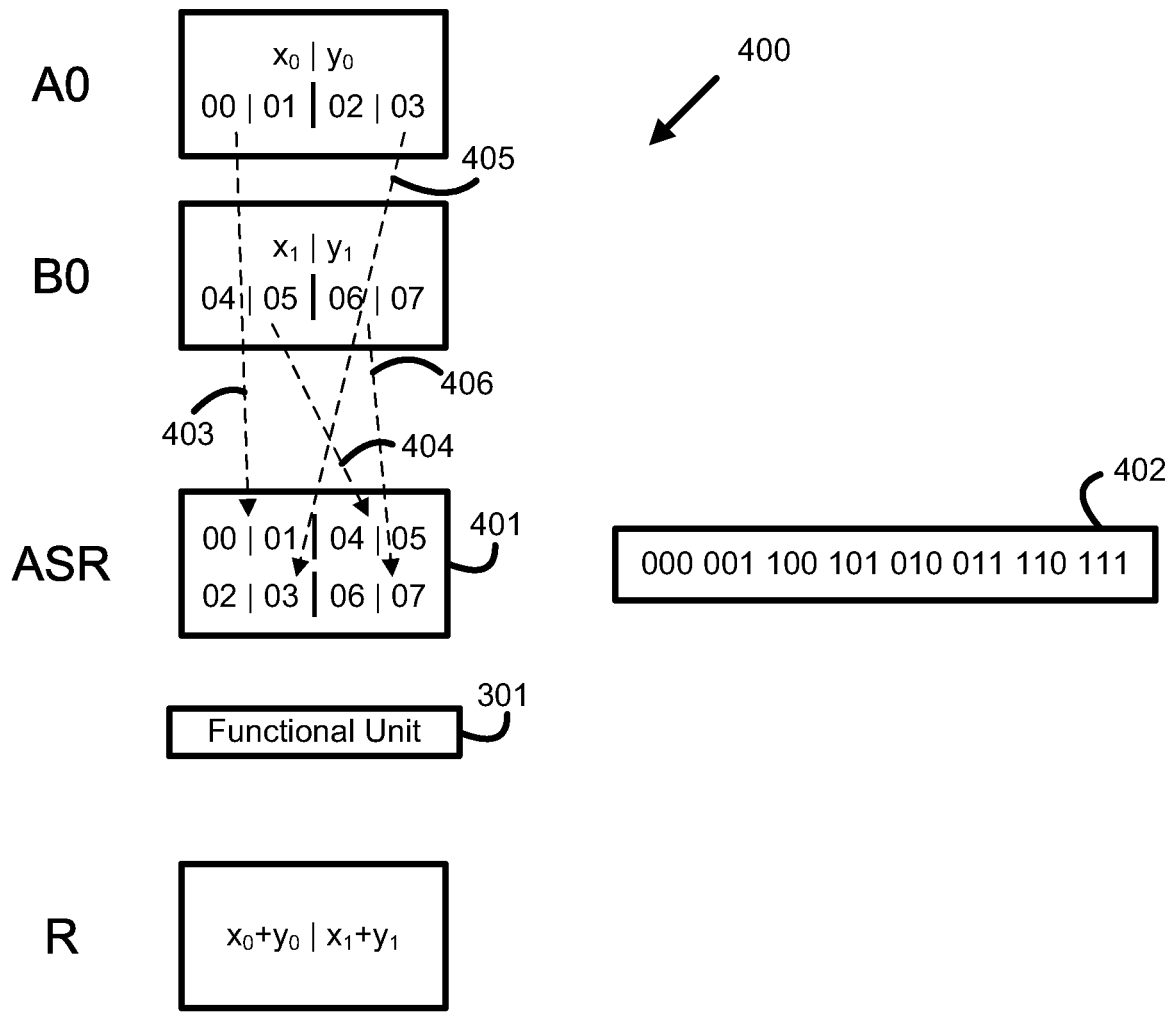
FIG. 4 is a block diagram illustrating one embodiment of a SIMD process flow utilizing inline data reorganization.

FIG. 4 is a block diagram illustrating one embodiment of a SIMD flow 400 utilizing low-overhead misalignment and reformatting support for SIMD to provide inline data reorganization to process the interleaved data set of FIG. 3B. With such inline data reorganization, the requirement for separate reformatting instructions is eliminated. A0 and B0 contain all the required data elements to perform the required operation, and as such, they can be reorganized inline such that the SIMD operation can be undertaken correctly.

It is noted that the granularity of data reorganizing is implementation-dependent. For instance, if only floating point SIMD is of interest, it is likely that the granularity of data reorganization will be on a 4-byte boundary; to not only limit the size of the ASRs, but to also minimize the complexity of the data reformatting hardware.

To process the data set of FIG. 4 through SIMD, the data set must be transformed such that the data enters the functional unit 301 in the same way as in FIG. 3A. To stipulate this transformation to the inline reformatting hardware, the initial data elements are labeled as illustrated in the lower rows of A0 and B0 of FIG. 4 (assuming 128-bit SIMD and 4-byte reformatting). Accordingly, to convey to the reformatting hardware the necessary reformatting operation, the hardware is provided with the mappings for each 4-byte element in the output. The mappings are illustrated in the ASR functional diagram 401 of FIG. 4 which is a functional representation of how the data is reorganized. Such reorganization is stipulated by eight 3-bit elements in the ASR 402 (four 4-byte chunks in A0, four 4-byte chunks in B0) as illustrated in FIG. 4. The ASR bit mask 402 is arranged such that:

output chunk 0 is taken from input chunk 0 and output chunk 1 is taken from input chunk 1 (line 403);
output chunk 2 is taken from input chunk 4 and output chunk 3 is taken from input chunk 5 (line 404);
output chunk 4 is taken from input chunk 2 and output chunk 5 is taken from input chunk 3 (line 405); and
output chunk 6 is taken from input chunk 6 and output chunk 7 is taken from input chunk 7 (line 406).

Thus, the functional unit 301 is presented the data set in the same way as the functional unit 301 of FIG. 3A, and the desired result of $x_0+y_0 \| x_1+y_1$ is placed into the result register R.

As noted, another data organization problem with SIMD operations may be misalignment issues. Misalignment may be more prevalent when superword alignment is required. Superword alignment is an alignment requirement that is larger than the natural alignment of the data element. For instance, superword requirement is mandated if 128-bit alignment is required for SIMD operations on 64-bit double precision floating point data.

Misalignment issues can also be handled with an extension to the concept described above with reference to FIG. 4. For the SIMD operations to function, the two data streams need to be correctly aligned with respect to each other, such that the pair-wise SIMD operations can operate correctly. A similar data reorganization technique may be used to handle misalignment problems if an additional input operand is provided. The additional operand is required since, unlike the prior reformatting example, not all of the required data is contained in the standard operands.

Figure 5A:
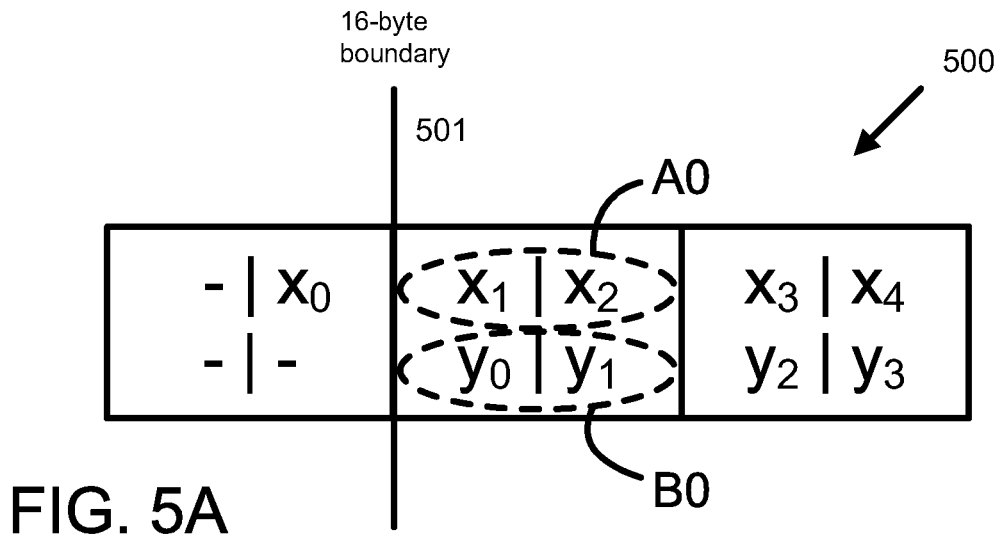
FIGS. 5A and 5B illustrate a SIMD process flow operating on misaligned data.
Figure 5B:
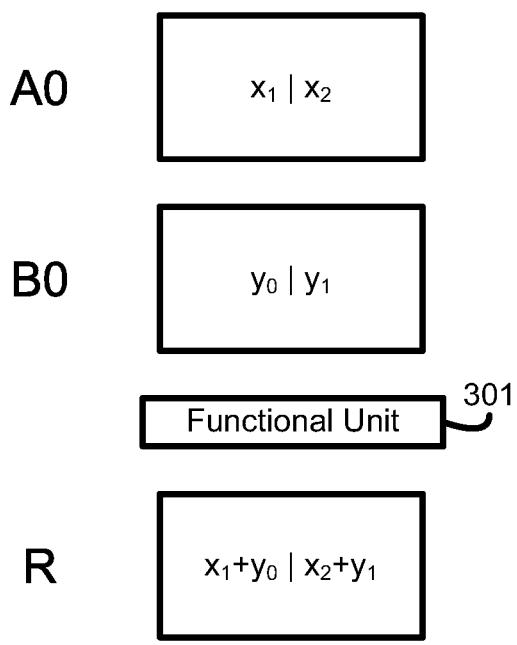

For instance, consider the situation where the x data stream is incorrectly aligned as illustrated in FIG. 5A. In FIG. 5A, the x data stream is incorrectly aligned such that the first data element $x_0$ is positioned on an opposite side of a 16-byte boundary 501 from the second data element $x_1$, and the first data element $y_0$ of the y data stream is properly aligned with the 16-byte boundary 501. In this situation, the desired operation is, as before: $x_0+y_0 \| x_1+y_1$. However, if the two elements (x and y) are loaded into the functional unit 301 without data reorganization, all of the desired elements are not included. In particular $x_0$ is not included. As illustrated in FIG. 5B, the pairing is such that if A0 and B0 are operated on by the functional unit 301 without data reorganization (such that A0=$|x_1|x_2|$ and B0=$|y_0|y_1|$), the undesirable result of $x_1+y_0 \| x_2+y_1$ would be placed into the result register R. Accordingly, the additional input operand is required to provide the prior data element $x_0$ from the x stream.

Figure 6A:
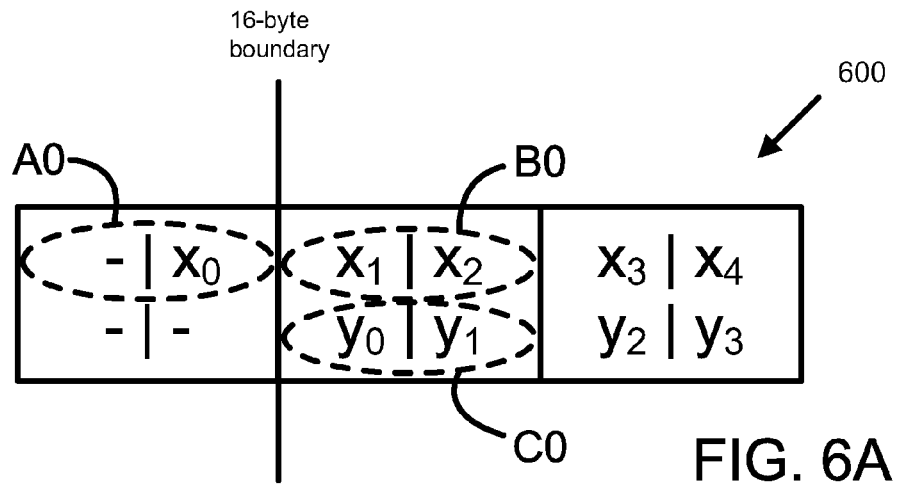
FIGS. 6A through 6D illustrate another embodiment of a SIMD process flow utilizing inline data reorganization.
Figure 6B:
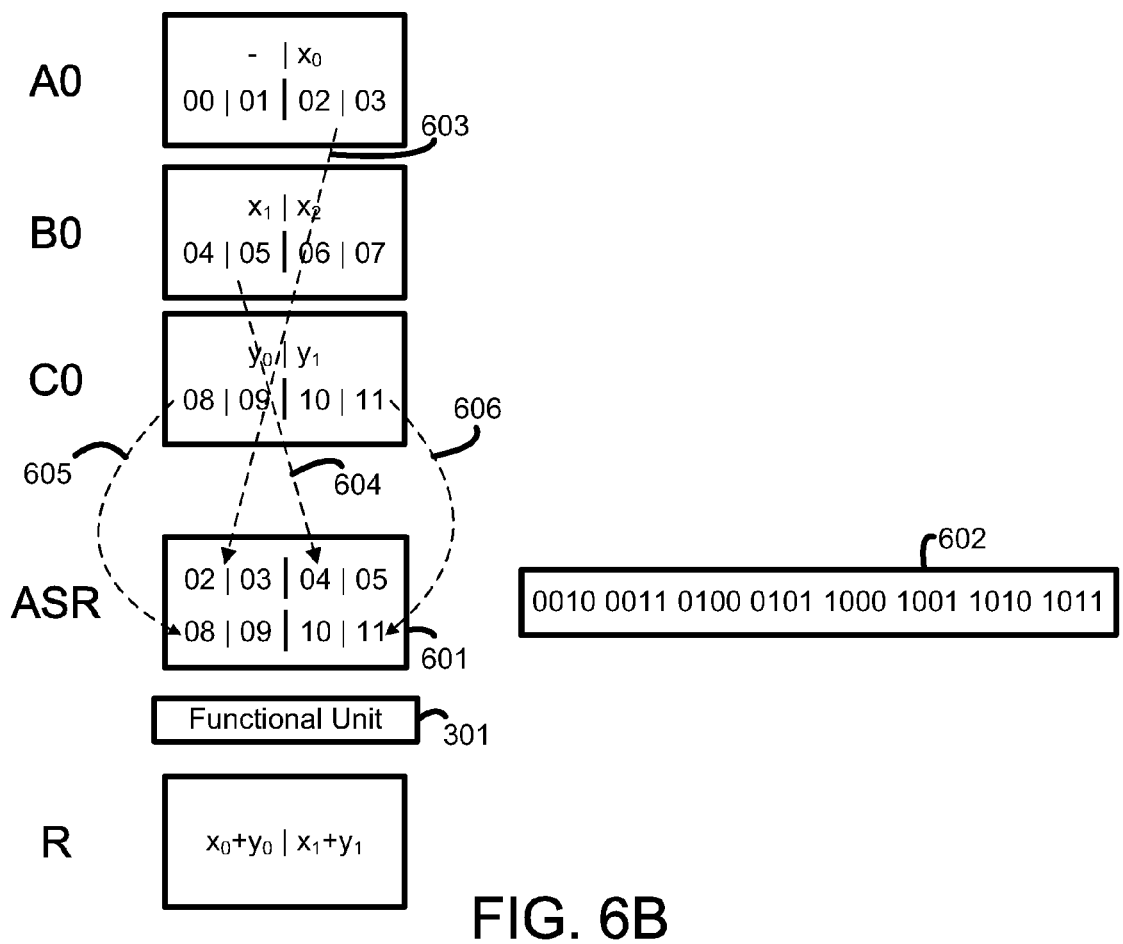

The use of the additional operand is illustrated in FIGS. 6A and 6B where three operands (A0, B0, and C0) are utilized. As illustrated, $x_0$ may be extracted from A0, $x_1$ may be extracted from B0, and $y_0$ and $y_1$ may be extracted from C0.

In this scenario, the ASR 602 is extended such that each of the eight elements is now 4-bits, such that it can extract data from the 3 input operands (4-byte chunks) to form the final two operands that are subsequently provided to the functional unit 301.

To process the data set 600 of FIG. 6A through SIMD processing, the data set 600 must be transformed such that the data enters the functional unit 301 the same as in FIG. 3A. To stipulate this transformation to the inline reformatting hardware, the initial data elements are labeled as illustrated in the lower rows of A0, B0, and C0 of FIG. 6A. Thus A0=$|-|x_1|$, B0=$|x_1|x_2|$, and C0=$|y_0|y_1|$. Accordingly, to convey to the reformatting hardware the necessary reformatting operation, the hardware is provided with the mappings for each element in the output. The mappings are illustrated in the ASR functional diagram 601 of FIG. 6A which is a functional representation of how the data is reorganized. Such reorganization is stipulated by eight 4-bit elements in the ASR 602. The ASR bit mask 602 is arranged such that:

output chunk 0 is taken from input chunk 2 and output chunk 1 is taken from input chunk 3 (line 603);
output chunk 2 is taken from input chunk 4 and output chunk 3 is taken from input chunk 5 (line 604);
output chunk 4 is taken from input chunk 8 and output chunk 5 is taken from input chunk 9 (line 605); and
output chunk 6 is taken from input chunk 10 and output chunk 7 is taken from input chunk 11 (line 606).

Thus, the functional unit 301 of FIG. 6B is presenting the data set in the same way as the functional unit 301 of FIG. 3A, and the desired result of $x_0+y_0 \| x_1+y_1$ is placed into the result register R.

Figure 6C:
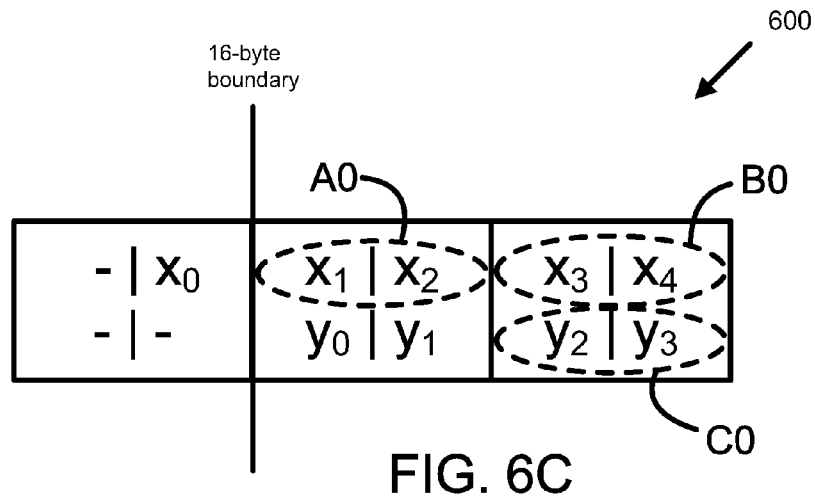
Figure 6D:
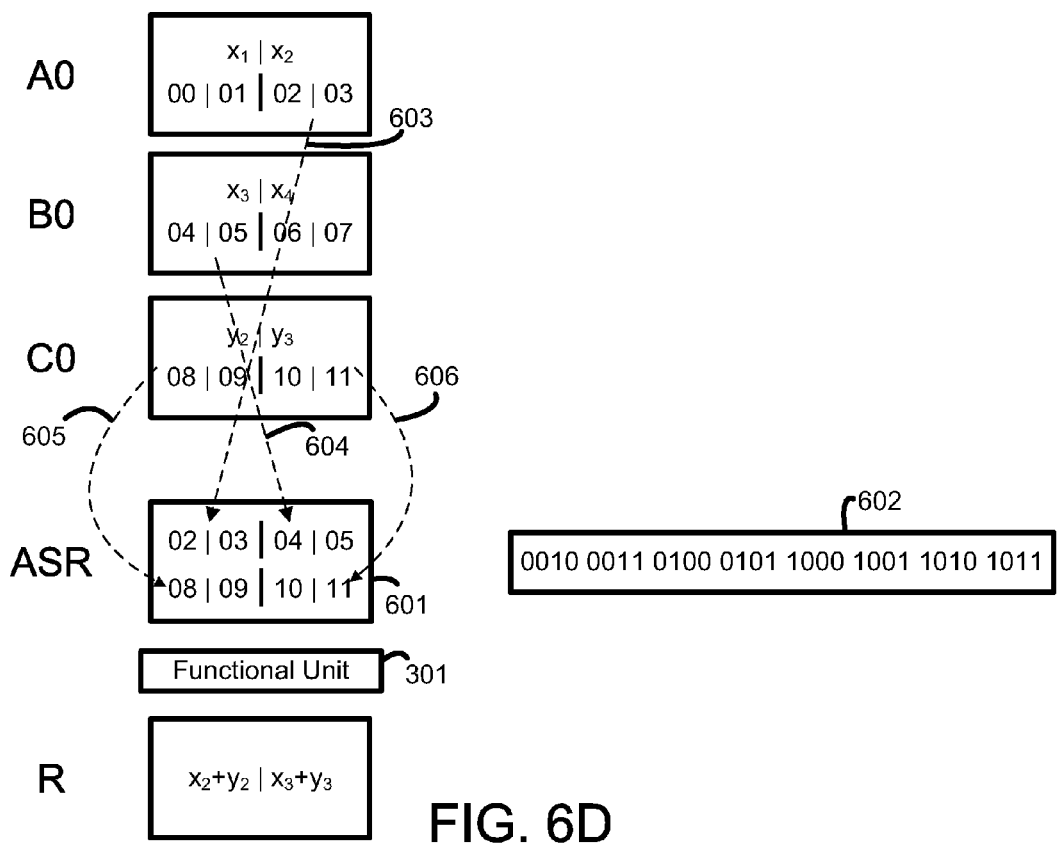

The same ASR format (i.e., no update is necessary) is required for the next iteration illustrated in FIGS. 6C and 6D. In this iteration, B0 (from the example of FIGS. 6A and 6B) becomes A0, and B0 and C0 are taken from the adjacent area. Thus A0=$|x_1|x_2|$, B0=$|x_3|x_4|$, and C0=$|y_2|y_3|$, and it is necessary to extract $x_2$ and $x_3$ and process them with $y_2$ and $y_3$. This is accomplished in the same way as described above with reference to FIGS. 6A and 6B, and the data enters the functional unit 301 the same as in FIG. 3A, resulting in the desired result of $x_2+y_2 \| x_3+y_3$ being placed into the result register R.

In the examples of FIGS. 6A through 6D, the SIMD instruction itself is also transformed from a two source operand instruction in to a three source operand instruction. It is also possible to have the third source operand as an implicit operand that is located in a known location (e.g. an adjacent SIMD register).

In current SPARC code, such misalignment is handled by the use of separate reformatting instructions called faligndata, resulting in a 50% increase in the processing instructions required per iteration. In contrast, using the low-overhead misalignment and reformatting support for SIMD described herein, the required reformatting is handled directly by the multiplication operation, removing the requirement for the separate faligndata instruction.

The set-up of the ASR or ASRs is typically undertaken once before entering the main loop. Computing the bit patterns to load into the ASR register can be rapidly determined using a look-up table (e.g., different entries in the tab relating to different misalignment possibilities), or by providing a number of dedicated instructions that compute the required bit patterns for common problems (e.g. one instruction for handling misalignment (like alignaddr on SPARC), one for common data organization issues, and so on). As these operands are performed once per loop, their impact on overall SIMD performance is low. Nonetheless, providing dedicated instructions simplifies the process for the compiler.

Figure 2:
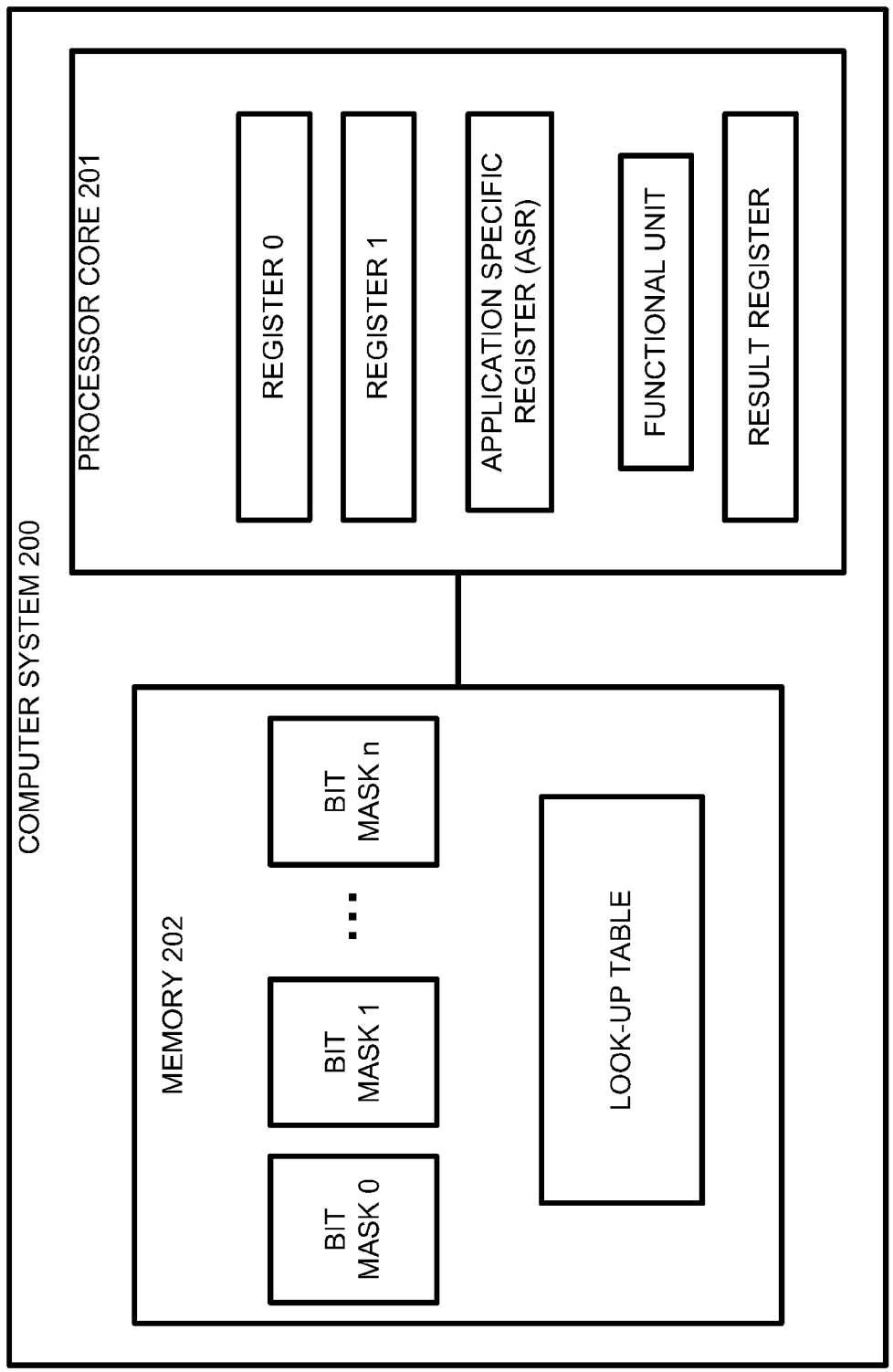
FIG. 2 is a block diagram illustrating one embodiment of a computer system for performing SIMD processing.

FIG. 2 is a block diagram illustrating one embodiment of a computer system for performing the SIMD processing described herein. A computer system 200 may be a personal computer, a portable computer, a workstation, a server computer, an Internet appliance, a plurality of interconnected computers, or any other appropriate device or devices that includes components that can execute the SIMD processing discussed herein. Hence, when the methods described herein are performed on any one or any combinations of these devices, the methods are computer-based methods. The computer system 200 may be configured to interface with a number of external devices.

The computer system 200 may include, inter alia, a processor core 201. The processor core may include the registers discussed herein such as the illustrated Register 0, Register 1, ASR, and Result Register. The illustrated registers are representative, and additional appropriate registers, including multiple instances of the illustrated registers and appropriate non-illustrated registers may also be included in the processor core 201. The processor core may include the functional unit which may be operable to perform SIMD instructions on the data within the appropriate registers. The functional unit may, for example, be a floating point functional unit.

The computer system 200 may also include a memory 202. Memory 202 represents all memory of the computer system 200 outside of the processor core 201. In various embodiments, memory 202 may comprise any suitable type of system memory, such as FB-DIMM, DDR/DDR2 SDRAM, or RDRAM, for example. Memory 202 may include multiple discrete banks of memory controlled by discrete memory interfaces. Also, in some embodiments, memory 202 may include multiple different types of memory. The memory 202 may be in any appropriate form or combination of forms including, for example, volatile memory, non-volatile memory, or a combination of the two. Portions of the memory 202 may be on board the same chip as the processor core 201 (e.g., in the form of cache memory) and/or portions of the memory 202 may reside in components discrete from the processor core 201. The memory 202 may also include a hard drive and/or removable memory such as CD-ROM discs, DVD discs, flash drives, ROM cards, floppy discs.

As illustrated, the memory 202 may include, inter alia, bit mask 0 through bit mask n (where n is any appropriate number) which may be loaded into the ASR as described herein upon determination of a data organization issue with data to be processed through the functional unit. The look-up table discussed herein may be stored in the memory 202.

Methods of the present invention may be implemented in a computer program. Such a computer program may be stored on any common data carrier like, for example, a floppy disk, a compact disc (CD), a digital video disc (DVD), and/or flash memory, as well as on any common computer system's storage facilities like hard disks and system memory. Accordingly, embodiments of the present invention also relate to a data carrier for storing a computer program including instructions for carrying out an embodiment of the inventive method. Embodiments of the present invention also relate to a method for using a computer system for carrying out an embodiment of the present inventive method. Embodiments of the present invention further relate to a computer system with a storage medium on which a computer program for carrying out an embodiment of the present inventive method is stored. A computer program product may include such a computer program stored on a medium configured to store or transport computer readable code. Examples of such a computer program product include such a computer program stored on CD-ROM discs, DVD discs, flash drives, ROM cards, floppy discs, magnetic tapes, computer hard drives, system memory, servers on a network, and signals transmitted over a network representing computer readable program code.

Register 0 and Register 1 of FIG. 2 are illustrative of a first plurality of registers on a processor core 201 that are used to store source operands. Such registers may be of any appropriate type, such as floating point registers, and are illustrative only and are not intended to limit the invention to the use of such registers. In view of this disclosure, one of skill in the art can select an appropriate plurality of registers on a processor for storing the source operands so as to facilitate the process described herein.

In the above examples, implementations regarding specific data organizations are presented. Moreover, implementation of addition functions is used as an illustration. However, the invention is not limited to any particular data organization scheme, any particular function, any particular SIMD instructions, any particular register size, to any specific operand type, or any specific operand sizes that are packed into the registers. In view of this disclosure, one of skill in the can implement operations utilized for any SIMD operation and for any register size and operand size or sizes of interest and utilize the data reorganization capabilities to reorganize data inline with the SIMD operation. Further, the use of particular registers and/or register types to store the source operands and the various masks is illustrative only and is not intended to limit the invention to the particular registers indicated.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

I claim:

1. A computer implemented method of performing a SIMD operation on a data set, said method comprising:

examining a structure of said data set to be processed according to said SIMD operation to determine whether one of a set of data organization issues is present in said data set;

when one of said set of data organization issues is present in said data set, selecting one of a set of stored bit masks for reorganizing said data set to facilitate performance of said SIMD operation on said data set, each of said set of stored bit masks corresponding to one of said set of data organization issues, said selected stored bit mask corresponding to said data organization issue present in said data set;

appending said SIMD operation to point to a chosen one of a plurality of application specific registers, each of said plurality of application specific registers containing one of said set of stored bit masks, said chosen application specific register corresponding to said selected stored bit mask;

reorganizing, after said selecting step, at least a first portion of said data set as said data set is loaded into a SIMD processing unit, wherein said reorganizing is performed in-line by said chosen application specific register according to said selected stored bit mask;

performing said SIMD operation on said reorganized data set; and writing a result of said SIMD operation to a destination register after said performing step.

2. The method of claim 1, wherein said examining step comprises a compiler inspecting said data set.

3. The method of claim 1, wherein said data set comprises a first array and a second array, wherein said examining step determines that a portion of said first array and a portion of said second array are disposed within a common register.

4. The method of claim 1, wherein said data set comprises a first array and a second array, wherein said examining step determines that said first array is misaligned relative to said second array.

5. The method of claim 4, further comprising:

organizing a portion of said data set into first, second, and third operands, wherein said first operand comprises a first data element of said first array, wherein said second operand comprises a second data element of said first array, wherein said third operand comprises a first data element and a second data element of said second array;

extracting said first data element of said first array from said first operand;

extracting said second data element of said first array from said second operand; and extracting said first and second data elements of said second array from said third operand, wherein said performing step comprises executing a SIMD instruction on a first data pair, wherein said first data pair includes said first data element of said first array and said first data element of said second array, wherein said performing step comprises executing said SIMD instruction on a second data pair, and wherein said second data pair includes said second data element of said first array and said second data element of said second array.

6. The method of claim 1, wherein said selecting step comprises accessing a look-up table, wherein said look-up table comprises said set of stored bit masks each corresponding to one of said set of data organization issues.

7. The method of claim 1, further comprising loading, after said selecting step and before said reorganizing step, said bit mask into said application specific register.

8. The method of claim 1, further comprising choosing said application specific register from said plurality of application specific registers.

9. A computer system for performing a SIMD operation, the computer system comprising:

a processor; and a data storage coupled to the processor, the data storage storing instructions that are operative to be executed by the processor to:

determine a structure of a data set;

select, based on said structure, a stored bit mask for reorganizing said data set to facilitate performance of said SIMD operation on said data set;

load said stored bit mask into an application specific register;

appending said SIMD operation to point to the application specific register;

reorganize at least a first portion of said data set as said data set is loaded into a SIMD processing unit, wherein said reorganizing is performed in-line according to said stored bit mask in said application specific register;

perform said SIMD operation on said reorganized data set; and write a result of said SIMD operation to a destination register after said performing step.

10. The computer system of claim 9, wherein said data set comprises a first array and a second array, wherein a portion of said first array and a portion of said second array are interleaved.

11. The computer system of claim 9, wherein said data set comprises a first array and a second array, wherein said first array is misaligned relative to said second array.

12. The computer system of claim 9, wherein the data storage comprises a look-up table, wherein said look-up table comprises a plurality of stored bit masks corresponding to a plurality of data set structures.

13. A non-transitory computer readable medium for performing a SIMD operation, the computer readable medium including instructions which when processed by a computer, cause the computer to:

examine a structure of a data set to be processed according to said SIMD operation to determine whether one of a set of data organization issues is present in said data set;

select, when one of said set of data organization issues is present in said data set, one of a set of bit masks for reorganizing said data set to facilitate performance of said SIMD operation on said data set, each of said set of bit masks corresponding to one of said set of data organization issues, said selected bit mask corresponding to said data organization issue present in said data set;

appending said SIMD operation to point to a chosen one of a plurality of application specific registers, each of said plurality of application specific registers containing one of said set of stored bit masks, said chosen application specific register corresponding to said selected stored bit mask;

reorganize at least a first portion of said data set as said data set is loaded into a SIMD processing unit, wherein said reorganizing is performed in-line by said chosen application specific register according to said selected bit mask; and perform said SIMD operation on said reorganized data set.

14. The computer readable medium of claim 13, wherein said data set comprises a first array and a second array, wherein a portion of said first array and a portion of said second array are interleaved.

15. The computer readable medium of claim 13, wherein said data set comprises a first array and a second array, wherein said first array is misaligned relative to said second array.

16. The computer readable medium of claim 13, wherein the computer readable medium comprises a look-up table, wherein said look-up table comprises said set of bit masks corresponding to a plurality of data set structures.

17. The computer readable medium of claim 13, wherein said instructions, when processed by said computer, cause said computer to load said selected bit mask into said application specific register.

18. The computer readable medium of claim 13, wherein said instructions, when processed by said computer, cause said computer to choose said application specific register from said plurality of application specific registers.

19. The computer readable medium of claim 13, wherein said instructions, when processed by said computer, cause said computer further to write a result of said SIMD operation to a destination register.

* * * * *